INVENTOR.
ROBERT P. DE LA VEGA

June 30, 1970 R. P. DE LA VEGA 3,517,861
POSITIVE-FEED POWDER HOPPER AND METHOD
Original Filed Nov. 14, 1966 5 Sheets-Sheet 2

INVENTOR.
ROBERT P. DE LA VEGA
BY
ATTORNEYS.

June 30, 1970  R. P. DE LA VEGA  3,517,861
POSITIVE-FEED POWDER HOPPER AND METHOD
Original Filed Nov. 14, 1966  5 Sheets-Sheet 3
Fig. 3.
Fig. 3a.
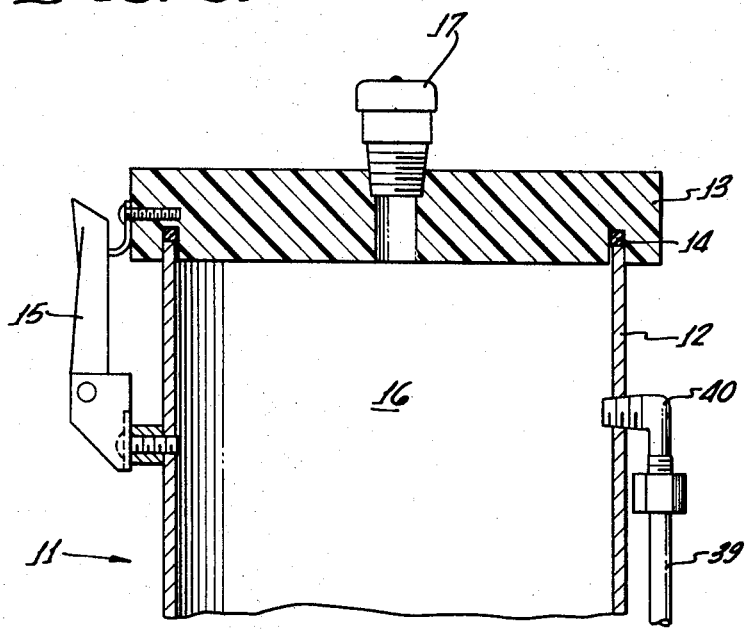
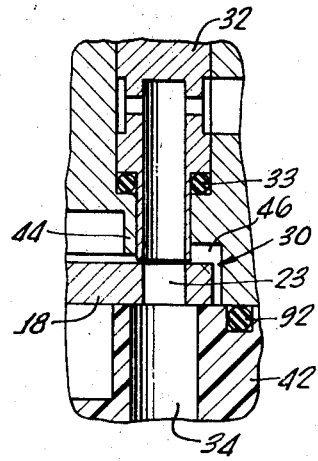
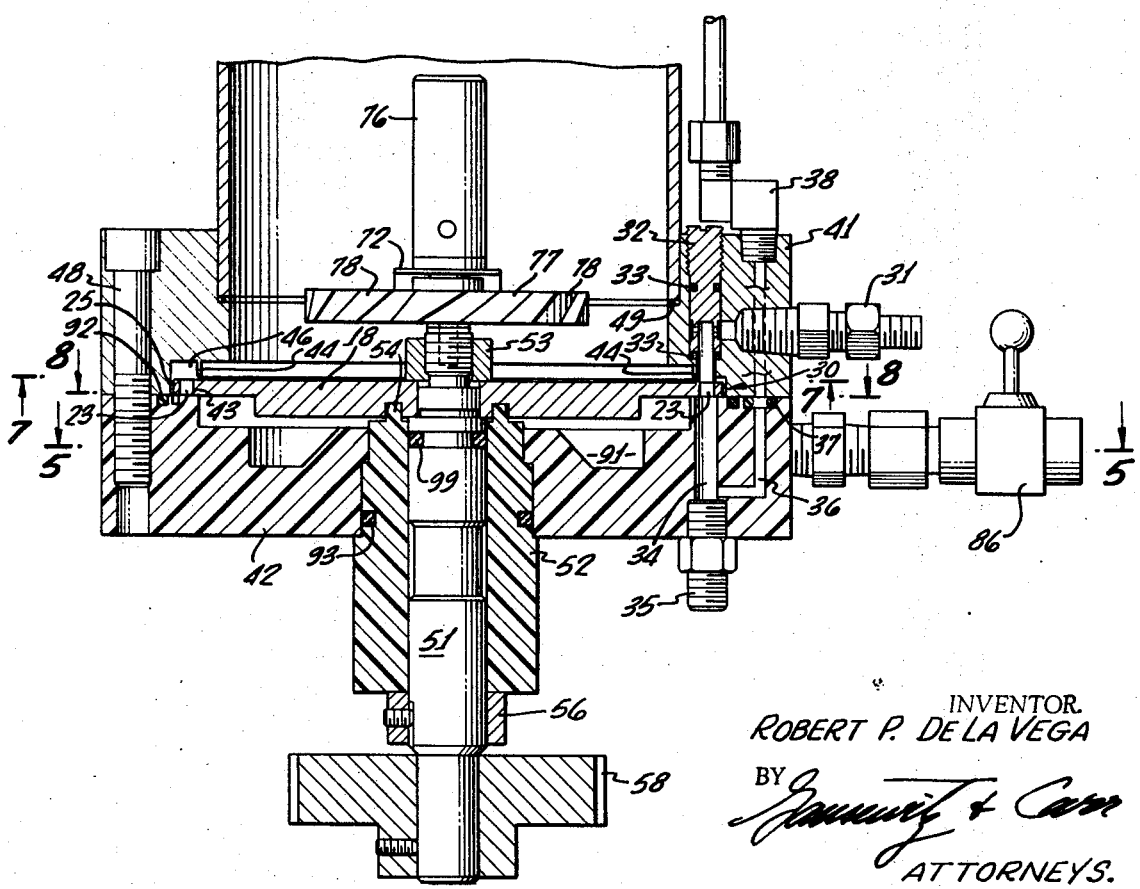
INVENTOR.
ROBERT P. DE LA VEGA
BY
ATTORNEYS.

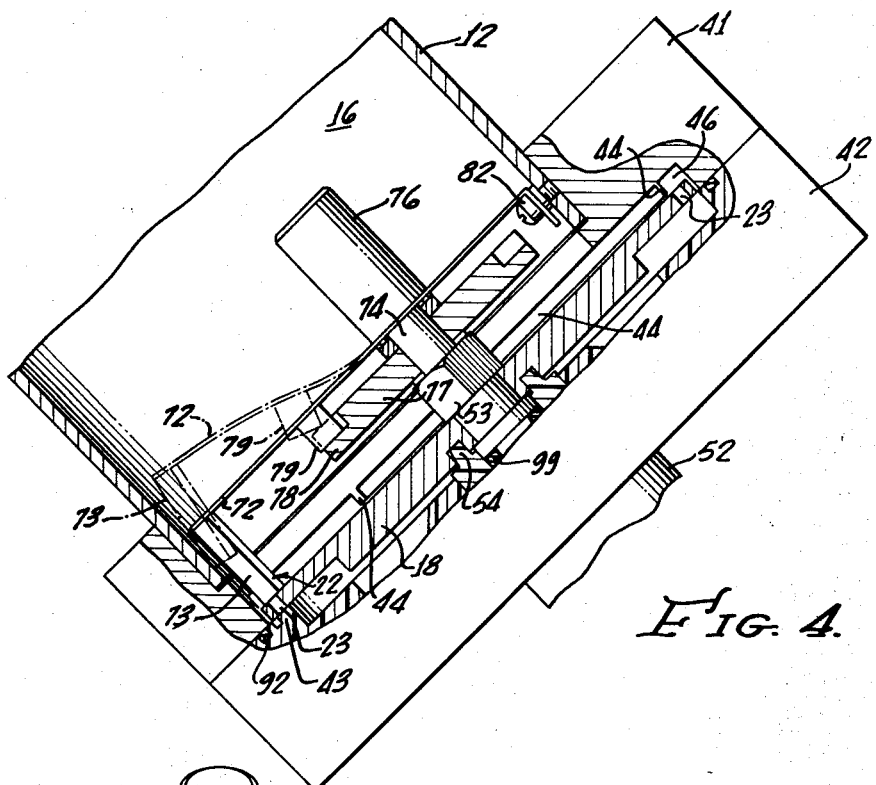
FIG. 4.
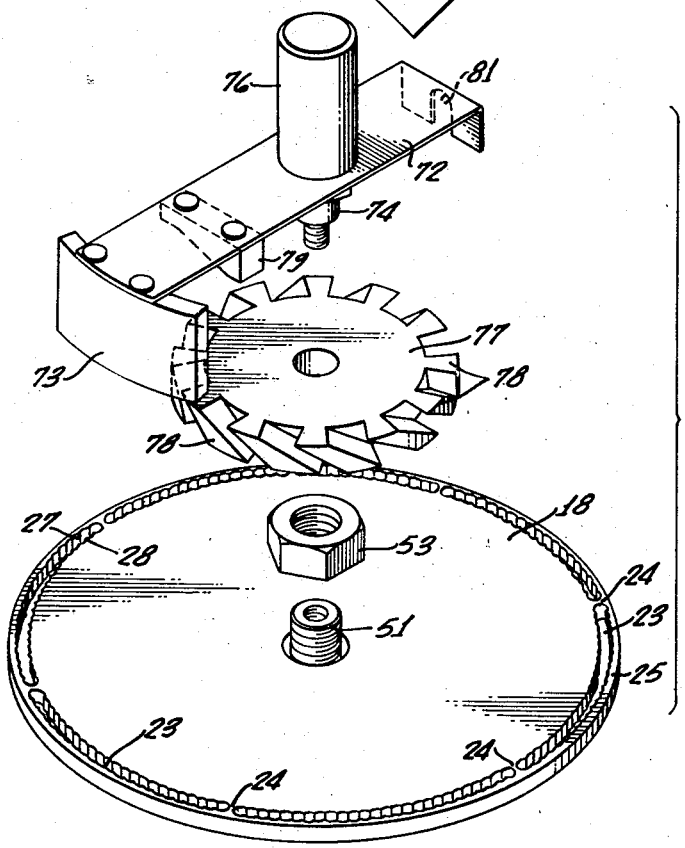
FIG. 6.
FIG. 6a.
INVENTOR.
ROBERT P. DE LA VEGA
BY
ATTORNEYS.

June 30, 1970  R. P. DE LA VEGA  3,517,861
POSITIVE-FEED POWDER HOPPER AND METHOD
Original Filed Nov. 14, 1966  5 Sheets-Sheet 5

INVENTOR.
ROBERT P. DE LA VEGA
BY
ATTORNEYS.

3,517,861
POSITIVE-FEED POWDER HOPPER AND METHOD
Robert P. De La Vega, Costa Mesa, Calif., assignor to Geotel, Inc., Amityville, N.Y., a corporation of Delaware
Continuation of application Ser. No. 593,836, Nov. 14, 1966. This application Sept. 19, 1968, Ser. No. 766,668
Int. Cl. B67d *5/54*
U.S. Cl. 222—194                        38 Claims

ABSTRACT OF THE DISCLOSURE

The present disclosure relates to a hopper wherein, and method whereby, powder is introduced into a moving mechanical element and thus transported to a predetermined discharge point at which gas is passed through the element to remove the powder therefrom and to conduct the powder to a desired point of use. The powder-receiving portions of the mechanical element are not discrete openings or recesses, but instead are elongated slots or a continuous, endless slot. This causes the powder feed to be continuous instead of intermittent. The side walls of the slots are serrated, scalloped, or otherwise shaped in such manner that many powders will move with the wheel despite the absence of discrete cylindrical or other openings, and despite the fact that the wheel is inclined. A self-cleaning, reciprocating tamping element is provided to insure that the powder fills the slots completely and uniformly. The hopper is adapted to be dumped without moving the base or the motor which drives the powder-feed element. Furthermore, the various seals in the apparatus, and auxiliary air-openings, are so arranged and constructed that auxiliary air may be introduced into the hopper and into the regions around the powder-feed element in order to effectively clean the apparatus.

CROSS-REFERENCE TO RELATED APPLICATION

This application is a continuation of my copending patent application Ser. No. 593,836, filed Nov. 14, 1966, now abandoned, for a Positive-Feed Powder Hopper and Method.

In prior-art powder-feed hoppers, for precision feeding or metering of powder, individual holes in a movable powder-feed element are adapted to be filled with powder, following which the element is moved to a station at which fluid is passed through the individual holes to thus provide entrainment of powder into te fluid stream. Therefore, the powder-feeding operation is necessarily intermittent (or "putt-putt") instead of continuous and steady. Applicant has discovered that substantially continuous, uniform and repeatable powder-feeding operations may be achieved by the use of elongated slots as distinguished from discrete openings. These slots have side walls which are serrated or scalloped in order to provide a powder-gripping effect and thus cause movement of many types of powders with the slots. Such movement occurs even though the slots may be continuous and endless, and even though the sloted element is substantially inclined.

The provision of slots instead of the large number of discrete holes (which characterize prior-art apparatus) produces several other very important advantages. One advantage is that the volume of the slots is far greater than the combined volumes of the holes, even when the holes are placed extremely close together. It follows that the present apparatus will feed a far larger volume of powder than will prior-art apparatus. Another major factor is that the webs which are formed between holes create a very definite wearing action relative to the underlying support element, particularly since the powder tends to be ground beneath such webs. Where there are few or no webs, as in the present apparatus, and where a given discharge volume may be obtained with a rotational speed far lower than in prior-art apparatus, the wear is greatly reduced.

In prior-art powder-feed hoppers of all types, not only those utilizing individual holes but also those providing screw feeds, etc., it was common to incorporate mixing chambers, or flow-smoothing chambers, in the outlet conduit from the apparatus. These were necessary because of the very uneven, intermittent flow of powder. With the present apparatus, wherein the entraining means is continuous instead of intermittent, the need for these extra chambers, flow-smoothing means, etc., is eliminated. Not only does this reduce the cost and complexity of the apparatus, but it greatly facilitates cleaning thereof.

The problem of cleaning a powder-feed hopper, for example when it is desired to change to a different type of powder, has long plagued prior-art workers. For example, in one commerical type of powder-feed hopper, it is necessary to overturn or invert the entire apparatus (weighing many pounds) in order to achieve a dumping action. Even after the apparatus is inverted, much powder clings to the various working parts and creates a contaminating effect after the new type of powder is introduced. In accordance with the present invention, it is possible to dump merely the powder receptacle itself and closely associated parts, it being unnecessary to invert the base, motor, etc. Furthermore, and very importantly, the sealing elements, baffles, etc., are so related to each other and to air-introduction means which are provided by the present invention that the inverted powder container may be substantially completely cleaned in a matter of seconds and without loss of a substantial amount of powder. Because of the continuous feeding action of the apparatus, there are no hard-to-clean mixers or flow-smoothing chambers in the outlet conduit.

In certain prior-art hoppers, an entire drum, cup, etc., was rotated in order to achieve the powder-transporting effect. In the apparatus described and illustrated herein, only the bottom wall of the hopper need be rotated and, furthermore, there are no seals between the hopper and the conduit means which effects powder entrainment. This facilitates cleaning, and prevents binding, galling and wear.

In the present apparatus, it is possible to discharge powder even at times when only an extremely small amount of powder is in the container, such container being inclined in order to cause the powder to remain by gravity in the desired charging area. The powder-entraining conduit means are located laterally of the powder container itself, thereby increasing the capacity of the container and facilitating the powder-cleaning or dumping operation.

To insure uniform packing or charging of each slot, the present apparatus provides (for numerous types and sizes of powders) a pounding or tamping mechanism. Stated otherwise, the present invention provides a very simple, removable and self-cleaning tamping means which creates the necessary pounding action without resulting in any clogging effect.

In view of the above and other factors, it is the object of the invention to provide a positive-feed powder hopper and method which effect a repeatable, uniform, and predictable power-feeding operation, and which effect feeding in a positive, smooth, and continuous manner.

A further object is to provide a powder-feed hopper which is simple and easy to clean and to dump, and wherein the powder cleaned therefrom may be readily retrieved in uncontaminated form for use during a subsequent operation.

A further object is to provide a power-feed hopper which will handle a wide range of particle sizes and types, and which has a large powder-storage capacity.

A further object is to provide a powder-feed hopper which operates satisfactorily over a wide range of speeds or volumes, from very low to very high.

An additional object is to provide a powder-feed apparatus which will entrain a very large amount of powder into a gas stream despite the fact that the apparatus operates at a relatively low rotational speed, thus greatly reducing the wear in the apparatus.

A further object is to provide an apparatus and method which can achieve a very high rate of powder feed.

An additional object is to provide a powder-feed apparatus which is inclined in such manner than substantially all of the contained powder may be discharged from the hopper, and in such manner that the tendency of the powder to clog the apparatus is reduced to a very minimum, yet which will handle substantially all types of powders, even those having extremely free-flowing characteristics.

Another object is to provide a powder-feed hopper which does not bind up or gall, and wherein there is nothing rubbing against the top of the powder-feed wheel, yet which will transport (even up a steep incline) numerous types of powders having various flow characteristics.

A further object is to provide a powder-feed apparatus which does not require the use of a vibrator, so that there is no tendency for mixed powders in the apparatus to stratify and segregate.

An additional object is to provide an improved apparatus for insuring that certan types of powders are tamped uniformly and effectively into the opening means in the powder-feed device.

Another object is to provide a simple and effective cleaning means for a powder-feed apparatus.

These and other objects will become apparent from the following detailed description taken in connection with the accompanying drawings in which:

FIG. 3 is a sectional view taken generally on line 3—3 of FIG. 2;

FIG. 3a is an enlarged fragmentary section of the region indicated at 30 in FIG. 3;

FIG. 4 is a fragmentary sectional view taken generally on line 4—4 of FIG. 2;

FIG. 6 is a fragmentary exploded view showing the powder-feeding wheel and the associated tamping mechanisms;

FIG. 6a is an enlarged, fragmentary detail view of a slotted portion of the feed wheel;

Figure 1:
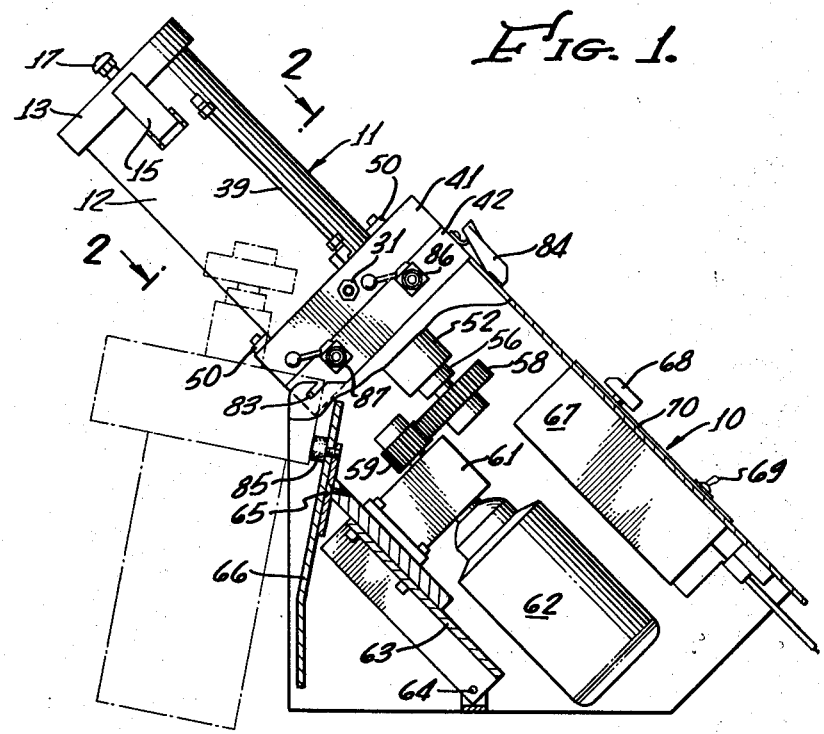
FIG. 1 is a side elevational view of a powder-hopper apparatus incorporating the present invention, the side wall of the base being broken away to illustrate the internal elements, the powder container being shown in phantom lines in dumping position.

Referring first to FIG. 1, the apparatus is illustrated to comprise a base portion 10 upon which is mounted a hopper or container portion 11. Stated more definitely, the hopper portion 11 is mounted at one upper side portion of the base and projects upwardly and laterally therefrom at an oblique angle, preferably on the order of about 45 degrees. The base portion 10 may be a sheet metal housing adapted to contain the drive motor, control means, drive gearing, etc., as will be described hereinafter.

The hopper portion 11 is illustrated to comprise an elongated hollow cylinder 12 which is nonrotatably mounted on a base described below. A removable cover 13, preferably formed of a transparent plastic, is mounted on the upper edge of cylinder 12, being sealingly associated with such cylinder by an O-ring 14 as shown in FIG. 3. Suitable means, such as trunk latches one of which is shown at 15 in FIG. 3, are provided to maintain the cover firmly seated on cylinder 12 in order to prevent leakage of gas from the chamber 16 defined within the cylinder. Because of O-ring 14, and other seals to be described hereinafter, chamber 16 may be maintained at a pressure substantially above atmospheric.

A suitable relief valve 17, shown in FIG. 3, is provided in a passage in cover 13 in order to permit escape of gas from chamber 16 should the pressure therein become excessive.

THE SLOTTED FEED WHEEL

At least a substantial portion of (and preferably all) the bottom wall of the chamber 16, that is to say the wall remote from cover 13, is formed by a movable powder-transport element 18. Stated more definitely, the powder-transport element 18, is a disc or wheel which rotates about a central axis, the axis being generally parallel to that of the chamber 16.

Figure 2:
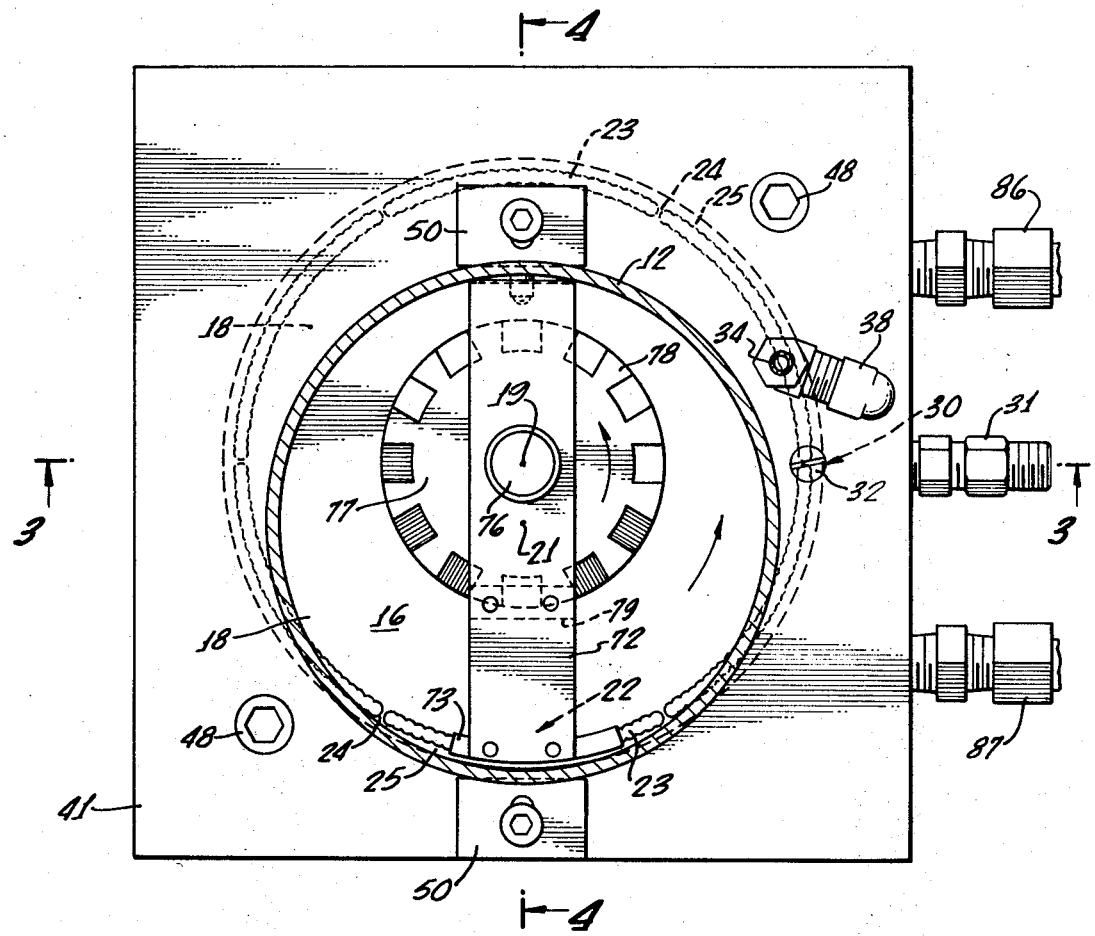
FIG. 2 is an enlarged horizontal sectional view on line 2—2 of FIG. 1.

Referring particularly to FIG. 2, the axis of rotation of wheel or disc 18 is indicated at 19 and is located a substantial distance from the axis 21 of chamber 16. More specifically, axis 19 is spaced a substantial distance upwardly from axis 21, that is to say away from the lowermost chamber region. Such lowermost chamber region is the slot-charging region indicated at 22 in FIGS. 2 and 4 being that region to which powder moves gravitationally in the hopper so that powder feed continues even though only relatively small amounts of powder are present.

In further reference to FIG. 2, it is pointed out that the diameter of the powder-transport wheel 18 is substantially larger than that of chamber 16. Accordingly, and because of the above-indicated eccentric positioning of the disc or wheel axis 19 relative to axis 21 of the chamber, a substantial portion of the disc 18 is disposed outwardly of the cylinder 12 at all times.

In accordance with a major feature of the invention, a plurality of elongated slots 23, which are curved and concentric with axis 19, are provided in the peripheral region of the powder-transport wheel 18. Stated otherwise, slots 23 lie along the circumference of a circle having its center at 19. The slots 23 are separated from each other by thin webs 24, the latter performing the function of supporting the region of wheel 18 radially outwardly from the slots, such region being numbered 25.

The webs 24 could be omitted if a separate drive means (or other connector means) were provided for insuring that the region 25 of the wheel 18 (outwardly from the slots 23) rotates about axis 19 in precise timed relationship (the same angular velocity) to the wheel region inwardly of the slots.

In view of the above, and in reference to the appended claims, something is to be considered a "slot" even though the elements forming the side walls of the slot are not directly connected. This would occur, for example, if the inner portion of wheel 18 and the outer portion 25 thereof were not connected by webs 24, but instead were driven at the same angular velocity and in such manner that the slot sides remained uniform (spacing between the inner and outer wheel portions the same, both rotating about the same axis).

In the illustrated embodiment, there are six slots each of which extend almost sixty degrees of the circle. The length of each slot is a number of times, preferably many times, the width thereof.

To aid in effecting movement of the powder (especially free-flowing powder such as tungsten) with the disc or wheel 18 despite the fact that elongated slots are used instead of cylinders, etc., and despite the inclination of the wheel, the slot walls should be separated and/or scalloped, rippled, etc. Thus, as best shown in FIG. 6a, the opposed slot walls are correspondingly scalloped or serrated. In the illustrated wheel, the peak portions of the opposed scalloped walls are correspondingly located. Thus, a peak 27 of the outer wheel region 25 is disposed along the same radius (relatively to axis 19) as is a peak 28 of the inner wheel region.

For feeding many types of powders, the slot walls need not be serrated or scalloped, but instead can be relatively smooth. Stated otherwise, the serrations or scallops are of greater benefit for feeding free-flowing powders such as tungsten.

As one illustration, the slotted periphery of wheel 18 may be 0.140 inch thick, and each slot may be so shaped that the radial distance between opposed peaks (such as 27 and 28) is 3/32 inch, whereas the radial distance between opposed valleys is 1/8 inch. This has been found satisfactory for feeding powders in the range of 1 to 140 microns.

When the wheel 18 rotates about axis 19 in the counterclockwise direction as indicated by the arrow in FIG. 2, powder which is present in slots 23 moves to a discharge position (station) which is lateral to the chamber 16, that is to say outside the cylinder 12 as viewed in FIG. 2. The discharge station is indicated at 30 in FIGS. 2 and 3, being approximately 90 degrees removed from the lower or slot-charging chamber region 22. It is pointed out that the discharge station 30 is, because of the inclined relationship of cylinder 12 and wheel 18, disposed at a much higher elevation than is the slot-charging region 22.

THE GAS-FLOW AND PRESSURIZING MEANS

Means are provided at the discharge station 30 to entrain powder from slots 23 in a stream of gas and to conduct the entrained powder to a desired point of use, such as an electrical plasma-jet spray torch. Stated otherwise, a gas stream is employed to progressively and positively remove the powder from each slot 23 as the wheel 18 rotates past the discharge station 30.

Referring particularly to FIG 3, the gas-flow means for achieving the above result includes an inlet fitting 31 which conducts pressurized argon, air or other carrier gas to a plug 32, the latter being associated with seals 33 to prevent escape of carrier gas from the apparatus. Plug 32 is threaded into the apparatus and is axially adjustable in a direction parallel to the axis of rotation. The gas flow downwardly through a central (axial) bore in the plug 32, through a region of the slot 23 then present at the discharge station, and through an outlet conduit 34 to an outlet fitting 35 which may be connected to a hose (not shown) leading to the plasma torch or other desired apparatus.

The axial bore or passage in the plug 32 has a diameter equal to the radial dimension of each slot 23 (at the valley regions of the slots, adjacent the peaks 27 and 28, FIG. 6a). If the passage in plug 32 were to have a diameter substantially larger than the radial dimension of slot 23, there would be an excess gas blast which would tend to remove (in an irregular manner) powder from the slots at regions other than the one directly beneath the passage end. Conversely, if the diameter of the passage in plug 32 were substantially smaller than the radial slot dimension, then the positive, uniform cleaning action of powder from the slot would be rendered less effective or even (with small passage diameters) eliminated.

The lower end of plug 32 (FIG. 3a) terminates in a rim which lies in a plane parallel to the upper surface of wheel 18. Such rim is caused to be very close to such upper surface, the clearance being preferably about 0.008 inch. This relationship causes the most effective gas-flow and powder-removal operations, and, in addition, provides a skimming effect which insures that no substantial amount of powder are carried above the wheel 18. Such small clearance is much less than is the clearance, described below, of the other elements above and adjacent wheel 18.

Some of the gas which is introduced downwardly into outlet conduit 34 is bled therefrom through a passage 36, from which it flows upwardly past the sealing ring 37 to a fitting 38. Fitting 38, in turn, connects to an external conduit 39 leading to an additional fitting 40, the latter being introduced through the wall of hollow cylinder 12 into a region of chamber 16 above the normal level of powder therein. In this manner, chamber 16 is maintained pressurized to a pressure equal to that at the discharge station 30. Therefore, and despite the fact that there are no gas seals between the discharge station and the chamber 16, there is no substantial tendency for the gas to flow through, above or below powder-transport wheel 18 to the chamber 16, it being understood that such flow would be undesirable in that it may product disadvantageous effects relative to the continuity and smoothness of the powder discharge.

In a typical application, such as feeding powder to a plasma-jet spray torch, the pressure in chamber 16 may be two or three pounds (for example) above atmospheric. Should a constriction in the outlet hose create an increased pressure in conduit 34, this increased pressure would be transmitted through elements 36, 39, etc., to chamber 16. A pressure-equalizing effect is thus produced, insuring that powder feeding will continue in a regular manner and without blowback into chamber 16.

THE HOUSING, BACKUP MEANS AND RELIEVED PORTIONS

The powder-feed wheel 18 is rotably mounted in, and the hollow cylinder 12 is sealingly supported on, a housing having upper and lower registered sections 41 and 42, respectively. Upper housing section 41 may be formed of metal, nylon, etc., whereas the lower housing section 42 is preferably formed of a low-friction material such as nylon which has been impregnated with molybdenum disulfide.

Wheel 18 rests slidably on only relatively narrow arcuate sections (FIG. 8) of lower housing 42. One such section, number 43, extends at least between the slot-charging region 22 (FIG. 2) and the discharge station 30, thereby preventing powder from dropping outwardly through the bottom of the slots during the transport to the outlet conduit 34. This section may be termed the "backup means." Furthermore, the arcuate section 43 extends beneath all portions of the slots 23 which are registered with the chamber 16, so that powder in the chamber does not directly drop into the lower housing.

Figure 8:
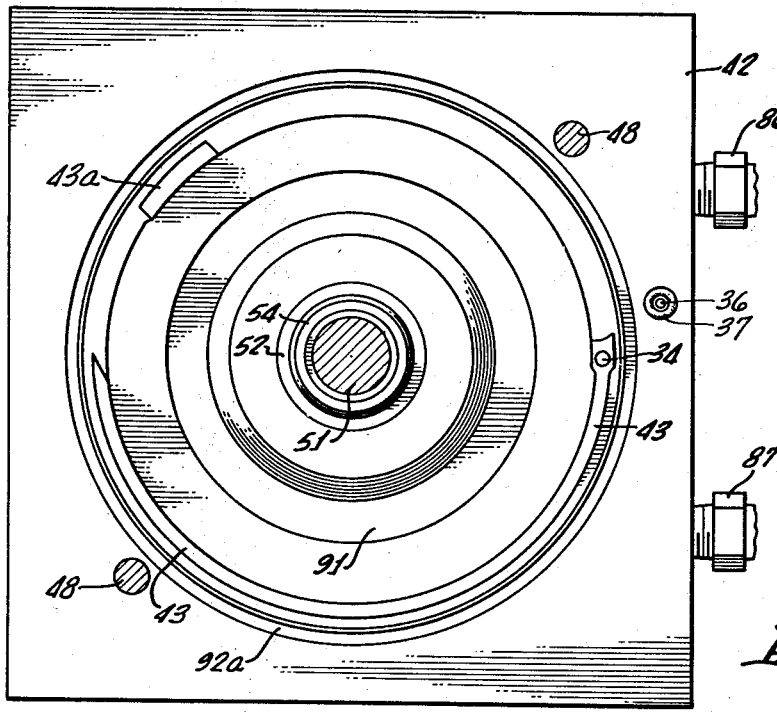
FIG. 8 is a sectional view on line 8—8 of FIG. 3, and looking downwardly to illustrate the support means for the wheel and also the relieved areas beneath portions of the wheel.

As indicated at 43a, FIG. 8, a short section is provided generally opposite the slot-charging region 22 for further support of the wheel peripheral portion. Sections 43 and 43a may be termed lands since the material all around the same is cut away from the feed wheel. The lands are only slightly wider than the slots, and register therewith.

The wheel is thus supported in low-friction sliding relationship (by lands 43 and 43a, which are co-planar) at all regions where necessary to prevent undesired dropping of powder or where necessary to effect wheel stability, but not at any other region. Thus, the amount of friction is minimized, and, furthermore, the tendency of powder to gall or wear beneath the wheel is minimized.

Figure 7:
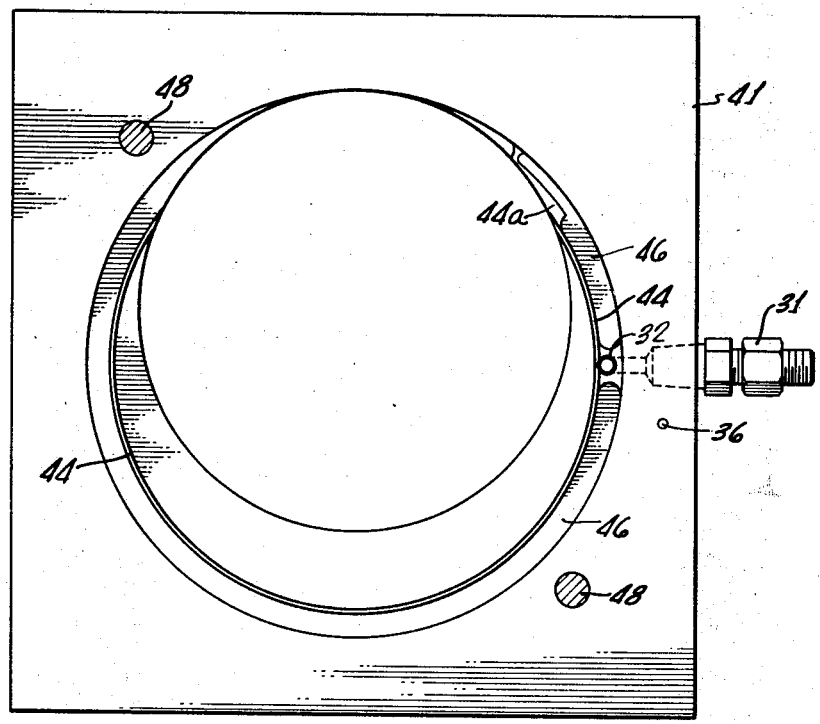
FIG. 7 is a sectional view on line 7—7 of FIG. 3, and looking upwardly so as to illustrate the relieved areas of the upper housing portion.

As best shown in FIGS. 3, 4 and 7, upper housing 41 is provided with a depending baffle or divider portion 44 which separates the main powder chamber 16 from relieved portions 46 of the upper housing. Such baffle portion 44 is located radially inwardly of the slots 23 except at regions where the slots are exposed within the chamber 16 (that is to say near region 22, lower portion of FIG. 2). The relieved portion 46 shown at the upper right in FIG. 7, and which extends from plug 32 toward the slot-charging region, may be referred to as a chamber. The lower wall of such chamber is slotted, and moves, being the feed wheel 18.

The lower edge of the baffle portion 44 is located a substantial clearance distance above the upper surface of wheel 18, for example 0.030 inch. Therefore, such baffle tends to prevent powder from flowing radially outwardly (along the upper surface of the wheel 18) from the chamber 16. On the other hand, the baffle or separator does not rub on the wheel 18 and does not tend to create a galling or binding action.

Because of the presence of the relieved portions 46, which are located above the slots (except in chamber 16), any powder which does flow radially outwardly along the upper surface of wheel 18 does not bind between the wheel and the upper housing and does not create any substantial deleterious effects.

The tilting or inclination of the hopper 11 tends to minimize flow beneath baffle or divider 44, and thus reduces any clogging tendency.

A relatively wide baffle portion, indicated at 44a in FIG. 7, provides a powder-skimming function in that it prevents substantial quantities of powder from moving with the wheel 18 to the discharge station 30 (except in the slots 23 as desired). Here again, there is no actual contact with the wheel, and no galling, binding, etc., the 0.030 inch clearance being again provided.

The outer cylindrical surface of disc 18 should be accurate and true, to minimize any tendency toward clogging or binding. Referring to FIG. 4, lower left portion, such surface is spaced a short clearance distance from the opposed wall of housing 41.

The upper and lower housing sections 41 and 42 are readily connected as by cap screws 48. The lower end of hollow cylinder 12 fits into a counterbore in upper housing section 41 and seats on a gasket 49 at the lower end of such counterbore. Suitable means, such as lugs indicated at 50 in FIGS. 1 and 2, are provided to prevent upward shifting of cylinder 12 out of the counterbore. The lugs 50 fit into cuts formed in the outer surface of the cylinder.

THE DRIVE MEANS

Proceeding next to a description of the drive means for the powder-feed disc or wheel 18, this comprises a shaft 51 (FIG. 3) which extends downwardly through a bearing 52, the latter being preferably formed of nylon or other suitable low-friction material. Shaft 51 is non-rotatably associated with the wheel 18, either frictionally or by means of a suitable key (not shown), and has a nut 53 at the upper and externally-threaded end thereof to prevent downward shifting of the shaft relative to the wheel. At the upper end of bearing 52, which seats in a suitable opening through lower housing portion 42, is provided a generally frustoconical collar region 54 for support of the wheel 18 at an annularly-grooved section thereof.

Mounted at the lower end of shaft 51, beneath bearing 52, are suitable collar means 56 and a gear 58, the latter being driven by a pinion 59 provided in the base 10 of the apparatus as shown in FIG. 1. The pinion 59 forms part of a gear-reducer apparatus 61 (FIG. 1) which is driven by a suitable electric motor 62, the gear reducer and motor being mounted on a plate 63 which is hinged at 64 and is secured at 65 to a panel portion 66 of base 10. Suitable control means 67 are provided to vary the speed of motor 62 in response to turning of a speed-control knob 68 located (along with an on-off switch 69) on the control panel 70 of the apparatus.

The speed of the powder-feed disc 18 is thus accurately controlled and may be adjusted through a substantial range. To change the speed range, it is merely necessary to replace both of the gears 58 and 59 with gears having a different tooth ratio.

THE TAMPING MEANS

Certain powders which are fed by means of the present apparatus will fall into slots 23, in response to the force of gravity, in a satisfactory, predictable manner which makes tamping unnecessary. However, there are various other powders, for example light plastics, which frequently bridge over the slots and will not fill the same adequately unless tamping is effected. In the present apparatus, tamping means are provided to pound the powder into the slots and thereby effect uniform, adequate, predictable filling of the slots regardless of the type of powder which is being fed.

Referring to FIG. 6, the tamping mechanism is illustrated to comprise a flat spring 72 having an arcuate hammer head 73 at one end thereof, the latter being shaped to hammer downwardly on the disc 18 over a slotted region thereof. Spring 72 is apertured to receive the threaded shank of an adapter screw 74 which is threaded downwardly into an internally threaded opening in the upper end of shaft 51. The head 76 of the adapter screw is preferably elongated, and knurled or suitably shaped, in such manner that it may be manually turned to simplify mounting and removal of the tamper means.

The shank of screw 74 also extends through a cam wheel 77 in such manner that the wheel rotates with the shaft 51 and its connected feed wheel 18. The periphery of the cam wheel is provided with inclined teeth 78 which create cam surfaces adapted, in response to rotation of the wheel, to effect intermittent upward and then downward movement of a cam follower 79 having a curved lower edge. Cam follower 79 is suitably mounted on the underside of spring 72, between screw 74 and hammer head 73. The end of the flat spring 72 remote from the hammer head 73 is bent downwardly and provided with a notch 81 which fits over an anchoring screw 82 (FIG. 4) in the wall of hollow cylinder 12.

In summary, therefore, the cam wheel 77 rotates with the shaft 51, but the flat spring 72 is retained, by the anchor screw 82, against rotation. Accordingly, the cam wheel 77 first actuates the spring (and connected hammer head) upwardly, against the pressure of the spring, and then suddenly releases the spring so that the hammer head is spring-pressed downwardly in a pounding action against the upper surface of wheel 18 over a slot 23. This effectively tamps the powder into the slot and prevents any bridging action.

The hammer head 73 is sufficiently long (along the slots), and the number of teeth 78 sufficiently great, that all portions of each slot are hammered at least once during each rotation of the feed wheel. As a specific example, the number of cam teeth, etc., and the length of the hammer head 73 longitudinally of slots 23, should be so related that the hammer blows overlap slightly (for example, by approximately 10 degrees of the entire circle). This insures that there will be no powder ridges between the pounded slot portions.

It is a feature of the invention that the face of the hammer which engages the feed wheel should not completely cover the slot, being instead substantially shorter than each slot (in a direction longitudinally thereof) although the slot is fully covered in its radial dimension. Therefore, should there already be powder in a particular slot portion during an attempt by the hammer to introduce an additional quantity of powder therein, the powder already in the slot may shift therein so that the pressure is relieved. Accordingly, each slot is uniformly filled with powder, at a constant packing pressure. This is to be contrasted with the operation which would occur, for example, if a large number of cylindrical holes were provided instead of slots In such case, and with numerous types of powders, some holes would be filled with powder prior to tamping whereas other holes would not. Those holes which were already filled would then be excessively tamped and would contain an excess quantity of powder, whereas the unfilled holes would contain much less powder. The result may be a distinctly disuniform feeding action.

Because the gaps adjacent teeth 78 extend completely through the cam wheel 77, powder may not build up in the regions below the cam follower 79. Accordingly, the device operates satisfactorily, and in a nonclogging manner, even though completely submersed in powder.

POWDER-CLEANOUT AND DUMPING MEANS

Referring particularly to FIG. 3, it is again pointed out that nothing rubs against the feed wheel 18 excepting the arcuate backup regions 43 and 43a (FIG. 8) at the upper surface of the lower housing element 42. Thus, when the powder chamber 16 is not under pressure, gas from inlet fitting 31 may readily pass along and through wheel 18 to the chamber 16. In accordance with the present invention, this fact is availed of to help achieve a simple and rapid cleaning operation. Furthermore, auxiliary gas-introduction means are provided to effect such cleaning. Cleaning does not take place, however, until after the hopper portion 11 of the apparatus has been pivoted about suitable hinge means 83 to the dumping position illustrated in phantom lines in FIG. 1.

Dumping is readily effected by removing the hopper cover 13, thereafter releasing a trunk latch 84 (or other securing means) which is provided between the lower housing 42 and base 10, and permitting the hopper 11 to pivot downwardly about hinge 83 to the illustrated phantom-line position. A rubber bumper 85 (FIG. 1) on panel 66 prevents jarring or injurious contact between the hopper and the panel. Prior to dumping, a plastic bag (for example) may be mounted over the upper end of the hollow cylinder 12 in order to receive the remaining contents of the hopper as dumping is effected.

It is emphasized that the gears 58 and 59 are so related that dumping is readily effected. For example, the illustrated gears are spur gears which disengage during the dumping action, the gear 58 being above the stationary gear 59.

Figure 5:
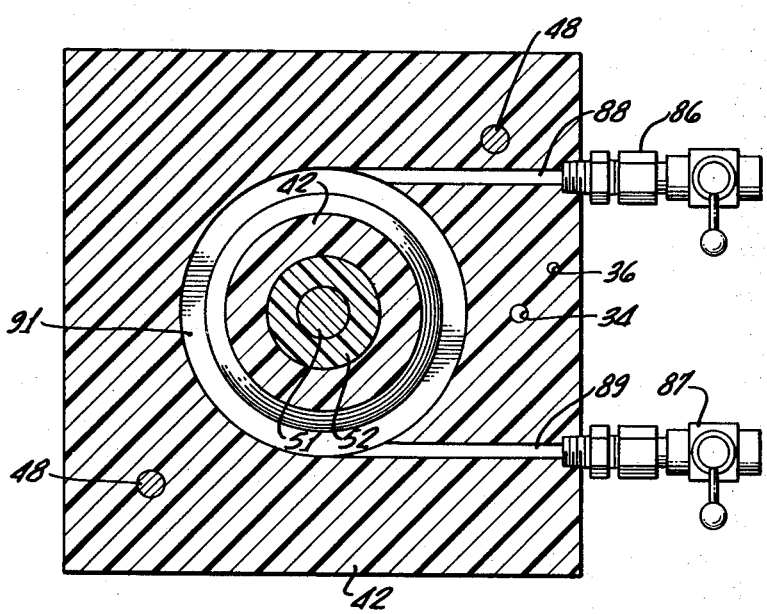
FIG. 5 is a sectional view on line 5—5 of FIG. 3 and illustrating a portion of the apparatus for effecting cleaning of powder between runs.

Referring particularly to FIG. 5, first and second valves 86 and 87 are mounted on lower housing 42 and communicate, respectively, with passages 88 and 89 which extend to an annular groove or recess 91 located beneath the central regions of feed wheel 18 (FIGS. 3 and 5). Such groove or recess 91 communicates with the chamber 16 (via the space beneath baffle or divider 44) through those of slots 23 which are not then resting upon the arcuate wheel-supporting portions 43 and 43a (FIG. 8) of the lower housing.

To clean the apparatus, after the dumping position has been achieved, the operator merely opens both the valves 86 and 87 and places an air nozzle (associated with a suitable compressed air source) in communication with one of the valves to effect flow of air inwardly through the associated passage 88 or 89. The air then flows vortically in the annular groove 91, causing powder in and adjacent the annular groove to flow out the other valve (where it may be retrieved in a suitable receptacle), and also into the main chamber 16 where it may be caught by the above-indicated plastic bag. The air-introduction step may then be repeated but with the air nozzle adjacent the other one of valves 86 and 87.

Thereafter, one of the valves 86 and 87 may be closed and the air nozzle disposed in communication with the other to further increase the pressure in annular groove or recess 91 and thus increase the upward flow of air around the wheel 18, through the slots 23, etc., for thorough removal of all powder. In addition, the air nozzle may be disposed in communication with the gas-inlet fitting 31 to thus effect flow of air through the powder discharge station 30 into the outlet 35 and/or into the chamber 16 for reception in the above-indicated plastic bag.

In the described manner, therefore, the powder is thoroughly removed from the apparatus and, furthermore, may be retrieved in an uncontaminated state. Because the present apparatus effects steady-state, smooth feeding of powder to the discharge or outlet fitting 35, without the necessity of providing mixing or flow-smoothing chambers, etc., there is no necessity for the laborious cleaning operations which were previously required relative to such chambers.

As previously indicated, and except during cleaning and filling operations, the entire hopper 11 and associated parts are maintained pressurized by gas introduced through fitting 31. In addition to the above-indicated O-ring 14 and gasket 49, and in order to prevent leakage of argon or other gas, various additional O-rings are provided. Thus, O-ring 92 (FIG. 3) is provided between the upper and lower housings 41 and 42 (in groove 92a, FIG. 8). O-ring 93 is mounted around the nylon bearing 52, and O-ring 99 around shaft 51.

METHOD OF OPERATION

To effect a powder-feeding operation, hopper 11 is pivoted to its upper (solid-line) position shown in FIG. 1, and latch 84 is secured. Cover 13 is removed, and a desired quantity of powder is introduced. Particularly if the powder is small in size and light in weight, the tamping means comprising cam wheel 77, hammer 73, flat spring 72, and cam follower 79 are provided as described in detail above relative to FIG. 6. The mounting of these elements is effected prior to introduction of powder into the hopper 11.

Cover 13 is then mounted in place and secured by latches 15. A source of argon or other suitable carrier gas is then connected to the fitting 31, effecting pressurization of the entire chamber 16 through the conduits 34, 36 and 39. Because of the presence of the conduit 39, there is no necessity for gas flowing upwardly through the powder in the hopper 11. It is pointed out that the cleaning valves 86 and 87 are maintained closed during operation of the apparatus and, furthermore, that the outlet fitting 35 is normally connected to a relatively long hose which provides a substantial impedance to gas flow.

The on-off switch 69 (FIG. 1) is then shifted to effect energization of motor 62, causing rotation of pinion 59 to drive the gear 58 and thus (FIG. 3) the shaft 51, feed wheel 18 and cam wheel 77. The rate of rotation of these elements is determined by adjusting the control knob 68 to determine the rate of motor operation.

The feed wheel 18 is thus rotated, in the direction shown by the arrow in FIG. 2, to cause powder in slots 23 to be shifted, along the upper surface (backup) region 43 (FIG. 8) of lower housing 42, to the discharge station 30. The argon or other carrier gas then positively and progressively removes such powder from slots 23 and causes the entrained powder to pass downwardly through conduit 34 (FIG. 3) and fitting 35 to the above-indicated hose.

The cam wheel 77 operates through cam follower 79 (FIG. 6) to cause upward and downward pounding movement of hammer head 73, thereby tamping powder into the slots 23. Despite the fact that the slots are long, and may be continuous and endless, powder is effectively and positively moved thereby as described relative to FIG. 6a.

The rate of feed of powder is determined substantially entirely by the rate of rotation of the wheel 18, not by the volume of flow of carrier gas. It has been found that the powder delivery rate may be controlled, with an accuracy between plus or minus 2½%, while using only ⅓ to ½ of the carrier gas required by many prior-art hoppers such as those of the feed-screw type. Powdered materials may be fed in a size range, for example, from 1 to 140 microns. The present hopper will feed substantially all powders, even those having a distinct tendency to clog conventional apparatus.

It has been found that the powder-feeding operation is highly continuous and non-pulsating, resulting in uniform coatings, more consistent blends, etc., when employed in conjunction with a plasma-jet spraying operation. The rate-of-feed curve is linear, and the feeding operation is highly repeatable between different runs and at different times. Because no vibrator is needed, mixed powders in the hopper will not segregate.

After cessation of the powder-feeding operation, and as described in detail above, the cover 13 is removed, latch 84 released, hopper 11 pivoted downwardly to the phantom-line position of FIG. 1, and an air source employed through air valves 86 and 87 and also through the fitting 31 to effectively and rapidly clean the apparatus of all residual powder.

The foregoing detailed description is to be clearly understood as given by way of illustration and example only, the spirit and scope of this invention being limited solely by the appended claims.

I claim:

1. A powder-feed apparatus, which comprises:
a powder-feed element having at least one elongated slot therein,
said slot having side walls shaped and disposed to provide a gripping action relative to the powder contained in said slot,
said side walls being scalloped,
backup means provided beneath said slot whereby powder introduced into said slot will not fall therethrough,
outlet means,
means to drive said powder-feed element along said backup means in such direction that successive portions along the length of said slot will progressively come into registry with said outlet means,
means to charge said slot with powder at a region spaced from said outlet means, and
means to effect flow of gas through the portion of said slot which is registered with said outlet means and in such direction that said gas passes from said slot portion into said outlet means to thus positively and progressively remove powder from said slot and entrain said removed powder in said gas for conduction through said outlet means to a desired point of use.

2. A powder-feed apparatus, which comprises:
a powder-feed element having at least one elongated slot therein,
backup means provided beneath said slot whereby powder introduced into said slot will not fall therethrough,
outlet means,
means to drive said powder-feed element along said backup means in such direction that successive portions along the length of said slot will progressively come into registry with said outlet means,
means to charge said slot with powder at a region spaced from said outlet means,
said slot-charging means including means to tamp powder into said slot, and
means to effect flow of gas through the portion of said slot which is registered with said outlet means and in such direction that said gas passes from said slot portion into said outlet means to thus positively and progressively remove powder from said slot and entrain said removed powder in said gas for conduction through said outlet means to a desired point of use.

3. A powder-feed apparatus, which comprises:
a powder-feed element having at least one elongated slot therein,
backup means provided beneath said slot whereby powder introduced into said slot will not fall therethrough,
outlet means,
means to drive said powder-feed element along said backup means in such direction that successive portions along the length of said slot will progressively come into registry with said outlet means,
means to charge said slot with powder at a region spaced from said outlet means,
said slot-charging means including reciprocating hammer means to provide a pounding action packing powder into said slot, and
means to effect flow of gas through the portion of said slot which is registered with said outlet means and in such direction that said gas passes from said slot portion into said outlet means to thus positively and progressively remove powder from said slot and entrain said removed powder in said gas for conduction through said outlet means to a desired point of use.

4. The invention as claimed in claim 3, in which the length of said hammer means longitudinally of said slot is less than the length of said slot.

5. A powder-feed apparatus, which comprises:
a powder-feed element having at least one elongated slot therein,
backup means provided beneath said slot whereby powder introduced into said slot will not fall therethrough,
outlet means provided on one side of said powder-feed element,
means to drive said powder-feed element along said backup means in such direction that successive portions along the length of said slot will progressively come into registry with said outlet means,
means to charge said slot with powder at a region spaced from said outlet means,
said slot-charging means including a powder hopper,
means to pressurize said hopper to cause the gas pressure therein to be above ambient, and gas-conduit means provided at the portion of said slot which is registered with said outlet means,
said gas-conduit means being disposed on the opposite side of said powder-feed element from said outlet means,
said gas-conduit means being disposed to effect flow of gas in such direction that said gas passes from said slot portion into said outlet means to thus positively and progressively remove powder from said slot and entrain said removed powder in said gas for conduction through said outlet means to a desired point of use.

6. A powder-feed apparatus, which comprises:
a powder container,
a powder-feed element having at least a portion located within said container,
said powder-feed element having powder-receiving means in at least said portion whereby to receive powder from said container,
means to drive said powder-feed element to conduct powder therein to a discharge region, and
tamper means disposed within said container and including a reciprocating hammer portion to pound powder into said powder-receiving means.

7. The invention as claimed in claim 6, in which said powder-feed element is a plate forming at least a substantial portion of the bottom wall of said container.

8. The invention as claimed in claim 6, in which said tamper means comprises a cam wheel driven by said drive means, a hammer element, and cam follower means associated with said wheel to transmit motion from said cam wheel to said hammer element to thus reciprocate said hammer element.

9. The invention as claimed in claim 8, in which said hammer element has a shank formed of spring metal and serving to bias the head of said hammer element toward said powder-receiving means.

10. The invention as claimed in claim 8, in which said cam wheel is formed with cam teeth which extend the entire distance through said wheel, whereby to prevent packing of powder into said wheel by said cam follower means.

11. The invention as claimed in claim 6, in which said powder-feed element is a plate, in which said powder-receiving means is an elongated slot in said plate and oriented longitudinally of the direction of movement thereof.

12. The invention as claimed in claim 11, in which the size of said hammer portion is such that substantially less than all of said slot is hammered during any given hammer blow.

13. A positive-feed powder-hopper apparatus, which comprises:
a base,
a powder container mounted on said base,
at least a substantial portion of the bottom of said container being open,
a powder-feed wheel mounted rotatably at the bottom of said powder container and registered with at least said open portion thereof,
the diameter of said wheel being sufficiently large that portions of said wheel are not registered with said container,
means to rotate said wheel about an axis generally parallel to the axis of said container,
powder-receiving means provided in said wheel to receive powder from said container,
said powder-receiving means extending completely through said wheel whereby powder may fall through said powder-receiving means from said container in the absence of a backup means,
backup means provided beneath said powder-receiving means to prevent falling of powder therethrough except at a predetermined discharge area located out of registry with said powder container,
a powder-outlet conduit located at said discharge area for progressive registry therewith by said powder-receiving means during rotation of said wheel, and
means to effect the flow of gas through said powder-receiving means and thence through said powder-outlet conduit whereby to progressively remove powder from said powder-receiving means and conduct the same into said powder-outlet conduit.

14. The invention as claimed in claim 13, in which said powder-receiving means comprises at least one elongated slot provided through said wheel, said slot being arcuate about the axis of rotation of said wheel.

15. The invention as claimed in claim 14, in which the side walls of said slot are scalloped.

16. The invention as claimed in claim 13, in which the axis of rotation of said wheel is inclined whereby powder is moved by said wheel in an upward direction from said powder container to said discharge area, and in which at least said open bottom portion of said container is located adjacent the lowermost region of said wheel whereby to effect feeding of powder by said wheel until said container is substantially empty.

17. The invention as claimed in claim 13, in which baffle means are provided over portions of said wheel adjacent the lower portion of said powder container, said baffle means being spaced above said wheel and not being in gas-sealing relationship relative thereto.

18. The invention as claimed in claim 17, in which the regions adjacent said baffle means are relieved to prevent binding of said wheel.

19. The invention as claimed in claim 17, in which said backup means extends from said open bottom portion to said discharge area, and in which substantially all of the remainder of the region beneath said wheel is relieved in order to minimize friction with said wheel and prevent galling and binding of said wheel.

20. The invention as claimed in claim 13, in which sealing means are provided to maintain said powder container pressurized and to maintain the regions adjacent said wheel pressurized, whereby substantially all gas introduced into said apparatus during powder-feeding operation thereof flows immediately to said powder-outlet conduit instead of flowing backwardly into said powder container.

21. The invention as claimed in claim 13, in which a gas-inlet conduit is provided in registry with said powder-outlet conduit and on the opposite side of said wheel therefrom, whereby gas flows directly from said inlet conduit through said powder-receiving means to said outlet conduit, and in which the portions of said apparatus surrounding said conduits in the vicinity of said powder-receiving means are not in sealing relationship relative to said wheel.

22. The invention as claimed in claim 13, in which the drive means for said wheel includes a drive motor and gear train located in said base, said gear train including first and second gears adapted to be pivoted away from each other, and in which means are provided to effect pivoting of said powder container to a powder-dumping position, said pivoting being such that said first and second gears automatically pivot away from each other during said dumping.

23. A powder-feed apparatus, which comprises:
a generally disc-shaped powder-feed wheel,
means to rotate said wheel about the axis thereof and to maintain said wheel in a plane which is inclined at a substantial angle from the horizontal,
said wheel having slot means therein extending along a circumference of an imaginary circle having the axis of rotation of said wheel as the center thereof,
backup means provided beneath at least a substantial portion of said wheel and disposed to prevent premature dropping of powder through said slot means,
a powder hopper containing gas at a pressure above ambient,
said hopper being adapted to introduce powder into said slot means adjacent the lowermost region thereof,
means to tamp powder into said slot means when at said lowermost region, and
outlet means located remote from said powder-introduction region and adapted to receive powder moved upwardly along said backup means in response to rotation of said wheel.

24. A powder-feed apparatus, which comprises:
a generally disc-shaped powder-feed wheel,
means to rotate said wheel about the axis thereof and to maintain said wheel in a plane which is inclined at a substantial angle from the horizontal,
said wheel having slot means therein extending along a circumference of an imaginary circle having the axis of rotation of said wheel as the center thereof,
the side walls of said slot means lying generally along circumferences of circles having said axis of rotation as the center, said side walls of said slot means being scalloped,
backup means provided beneath at least a substantial portion of said wheel and disposed to prevent premature dropping of powder through said slot means, means to introduce powder into said slot means adjacent the lowermost region thereof, and outlet means located remote from said powder-introduction means to receive powder moved upwardly along said backup means in response to rotation of said wheel.

25. The invention as claimed in claim 24, in which the apex portions of the scallops are directly opposite each other.

26. A powder-feed apparatus, which comprises:

a generally disc-shaped powder-feed wheel, means to rotate said wheel about the axis thereof and to maintain said wheel in a plane which is inclined at a substantial angle from the horizontal, said wheel having slot means therein extending along a circumference of an imaginary circle having the axis of rotation of said wheel as the center thereof, backup means provided beneath at least a substantial portion of said wheel and disposed to prevent premature dropping of powder through said slot means, means to introduce powder into said slot means adjacent the lowermost region thereof, said powder-introduction means including a closed powder hopper, outlet means located remote from said powder-introduction means to receive powder moved upwardly along said backup means in response to rotation of said wheel, gas-introduction means to pass gas transversely through said slot means and into said outlet means, and bleed passage means provided between said outlet means and said hopper whereby to pressurize the latter.

27. Apparatus for feeding numerous types of powders, including extremely free-flowing powders, in a uniform, predictable manner, which comprises:

a powder-feed element shaped to define at least a major portion of elongated slot means, backup means provided beneath said slot means whereby powder introduced into said slot means will not fall therethrough, outlet means, means to drive said powder-feed element along said backup means in such direction that successive portions along the length of said slot means will progressively come into registry with said outlet means, means to define a main hopper chamber communicating with said slot means at a charging region spaced from said outlet means whereby to effect charging of said slot means from said main hopper chamber at said charging region, wall means disposed between said charging region and said outlet means, said wall means being above said powder-feed element and extending to the vicinity of said outlet means, said wall means being spaced sufficiently far above said powder-feed element to prevent binding of said powder-feed element due to the presence of powder between said powder-feed element and said wall means, and means to effect flow of gas through the portion of said slot means which is registered with said outlet means and in such direction that said gas passes from said slot portion into said outlet means to thus positively and progressively remove powder from said slot means and entrain said removed powder in said gas for conduction through said outlet means to a desired point of use.

28. The invention as claimed in claim 27, in which said slot means comprises a plurality of elongated slots formed in said powder-feed element, said slots being in end-to-end alignment and being separated from each other by thin webs, whereby the spacing between adjacent slot ends is small.

29. The invention as claimed in claim 27 in which said gas-flow means includes a conduit the lower end of which is disposed above said powder-feed element in substantial registry with said outlet means.

30. The invention as claimed in claim 29, in which said lower conduit end is closely adjacent said powder-feed element, being substantially closer thereto than is said wall means.

31. The invention as claimed in claim 29, in which the inner diameter of said conduit at said lower end substantially corresponds to the width of said slot, said lower end being substantially registered with said slot.

32. The invention as claimed in claim 29, in which said wall means forms part of a means to form a second and relatively small chamber located above said powder-feed element and adjacent said lower end of said conduit.

33. The invention as claimed in claim 27, in which said powder-feed element is inclined at a substantial angle, and in which said charging region is at an elevation much lower than that of said outlet means.

34. Apparatus for feeding precise quantities of numerous types of powders, which comprises:

a powder-feed disc having slot means formed therethrough at the peripheral portion thereof, said slot means being oriented circumferentially of said disc and extending in a circle therearound, means to mount said disc for rotation about an inclined axis located at the center of said slot circle, drive means to rotate said disc about said axis, an open-bottomed powder hopper mounted over said disc, said hopper having at the lower portion thereof an effective inner diameter smaller than the diameter of said disc, said lower portion of said hopper being relatively adjacent but out of contact with the upper surface of said disc, said lower portion of said hopper being registered with the lower-elevation portion of said disc whereby the lower-elevation portion of said slot circle is exposed in said hopper and may be charged with powder therefrom, backup means mounted beneath said disc at said slot circle and extending at least from said exposed portion of said slot circle to a discharge region spaced therefrom and at a substantially higher elevation, said discharge region being out of registry with said hopper, said discharge region being spaced away from said exposed portion of said slot circle in the direction of rotation of said disc, an outlet port located at said discharge region and beneath said disc in registry with said slot circle, a gas-flow conduit disposed above said disc and having a lower end registered with said slot circle and with said outlet port, said lower end of said conduit being closely adjacent the upper surface of said disc, means to pass gas downwardly through said conduit and through the portion of said slot means registered therewith and into said outlet port, and means to define a chamber above said disc and between said exposed portion of said slot circle and said lower end of said conduit, said chamber communicating with said slot means.

35. The invention as claimed in claim 34 in which skimmer means are provided above said disc between said chamber and said exposed portion of said slot circle.

36. The invention as claimed in claim 34, in which said hopper is sealed, and in which conduit means are provided to connect said outlet port to said hopper at a region normally above the powder therein, whereby to substantially equalize the pressure in said hopper relative to that at said outlet port.

37. A powder-feed apparatus, which comprises a powder-feed element having at least one elongated slot therein,
backup means provided beneath said slot whereby powder introduced into said slot will not fall therethrough,
outlet means,
means to drive said powder-feed element along said backup means in such direction that successive portions along the length of said slot will progressively come into registry with said outlet means,
means to charge said slot with powder at a region spaced from said outlet means,
said charging means including a sealed hopper,
means to effect flow of gas transversely through the portion of said slot which is registered with said outlet means and in such direction that said gas passes from said slot portion into said outlet means to thus positively and progressively remove powder from said slot and entrain said removed powder in said gas for conduction through said outlet means to a desired point of use, and
conduit means independent of said slot to equalize the pressure between said outlet means and said hopper, whereby gas from said gas-flow means flows only transversely through said slot and does not flow longitudinally of said slot to said hopper.

38. A powder-feed apparatus, which comprises:
a generally disc-shaped powder-feed wheel,
means to rotate said wheel about the axis thereof and to maintain said wheel in a plane which is inclined at a substantial angle from the horizontal,
said wheel having slot means therein extending along a circumference of an imaginary circle having the axis of rotation of said wheel as the center thereof,
backup means provided beneath at least a substantial portion of said wheel and disposed to prevent premature dropping of powder through said slot means,
a powder hopper containing gas at a pressure above ambient,
said hopper being adapted to introduce powder into said slot means adjacent the lowermost region thereof,
outlet means located remote from said powder-introduction region and adapted to receive powder moved upwardly along said backup means in response to rotation of said wheel,
gas-introduction means to pass gas transversely through said slot means and into said outlet means, and
bleed passage means provided between said outlet means and said hopper whereby to pressurize the latter.

References Cited

UNITED STATES PATENTS

| 2,285,216 | 6/1942 | Lundgren | 302—49 |
| 2,854,173 | 9/1958 | Lalin | 222—194 |
| 3,260,408 | 7/1966 | Smitzer et al. | 222—194 X |

FOREIGN PATENTS

| 752,607 | 7/1956 | Great Britain. |
| 742,675 | 12/1955 | Great Britain. |
| 808,459 | 2/1959 | Great Britain. |

ROBERT P. REEVES, Primary Examiner

H. S. LANE, Assistant Examiner

U.S. Cl. X.R.

302—49